INVENTOR.
DAVID F. BOWMAN
BY
OSTROLENK, FABER, GERB & SOFFEN
ATTORNEYS

Nov. 8, 1966 D. F. BOWMAN 3,284,725
MICROWAVE COUPLER FOR COMBINING TWO ORTHOGONALLY
POLARIZED WAVE UTILIZING A RIDGE-LIKE IMPEDANCE
MATCHING MEMBER
Filed Jan. 15, 1962 6 Sheets-Sheet 4

INVENTOR.
DAVID F. BOWMAN
BY
OSTROLENK, FABER, GERB & SOFFEN
ATTORNEYS

INVENTOR.
DAVID F. BOWMAN
BY
OSTROLENK, FABER, GERB & SOFFEN
ATTORNEYS

Nov. 8, 1966 D. F. BOWMAN 3,284,725
MICROWAVE COUPLER FOR COMBINING TWO ORTHOGONALLY
POLARIZED WAVE UTILIZING A RIDGE-LIKE IMPEDANCE
MATCHING MEMBER
Filed Jan. 15, 1962 6 Sheets-Sheet 6

INVENTOR.
DAVID F. BOWMAN
BY
OSTROLENK, FABER, GERB & SOFFEN
ATTORNEYS

United States Patent Office 3,284,725
Patented Nov. 8, 1966

3,284,725
MICROWAVE COUPLER FOR COMBINING TWO ORTHOGONALLY POLARIZED WAVES UTILIZING A RIDGE-LIKE IMPEDANCE MATCHING MEMBER
David F. Bowman, Wayne, Pa., assignor, by mesne assignments, to Airtron Division of Precision Products, Inc., Morris Plains, N.J., a corporation of Delaware
Filed Jan. 15, 1962, Ser. No. 166,205
6 Claims. (Cl. 333—9)

My invention relates generally to a broad band microwave structure and more particularly to a relatively simply constructed signal coupler to combine two independent wave signals, polarized in a 90 degree space relationship into a composite dual polarized wave signal.

The use of microwave equipment is becoming increasingly common in a multitude of long range communication systems. The manner in which such short wavelength signals propagate through space have made possible, such broad fields of investigation as radar, radiotelescopy, troposcatter communication and space communication. However, the very characteristics which make microwave signals desirable for free space communication, oftentimes complicate their local transmission. That is, the conduction of such signals must be effected in waveguides because of the tendency of higher frequency electromagnetic energy to propagate and radiate away into space. If an attempt is made to convey energy of such frequencies from one place to another along an open wire transmission line, most of the energy will radiate into space before reaching its destination.

To avoid this radiation loss, a hollowed pipe or waveguide is used. The skin effect at such high frequencies will limit the flow of current to the surfaces of the walls. The energy penetrates only a slight depth, and if the metallic wall is thick enough it will not reach the other side. At microwave frequencies, the thickness of the layer where all the current is concentrated is extremely small, and any practical thickness of wall is sufficient to prevent escape of energy. Thus, practically all of the energy will reach its destination, with the slight loss due to finite conductivity of the metal wall corresponding to the ohmic loss of lower frequency transmission line.

As is well known in the art, microwave energy is associated with an electromagnetic field and its propagation in a waveguide must satisfy certain mathematical conditions imposed by Maxwell's equations. The satisfaction of these requirements result in particular geometrical configurations of varying electric and magnetic field capable of existing in a particular waveguide; each such configuration being known as a mode. Each mode can propagate through a waveguide only if its frequency is higher than a particular cut-off value. This value will depend upon the geometric configuration of the electromagnetic field and the waveguide's dimension. The mode having the lowest cut-off frequency for a particular waveguide is nomenclated in the $TE_{10}$ mode with the symbolic representation being well known in the art.

Most commercially available waveguides are of generally rectangular cross-section having a 2:1 ratio between their long and short walls; this ratio being termed the aspect ratio. In such a waveguide the cut-off wave length for the dominant $TE_{10}$ mode will be equal to twice the long dimension; The cut-off wave length for the orthogonally related $TE_{01}$ mode is equal to the long dimension of such a guide.

A waveguide of particular external dimension may be loaded to have its impedance altered in such a manner as to lower the cut-off frequency of a particular mode. Typically, a rectangular wave guide would have a ridge-like member placed across the guide parallel to the shorter sides and midway between them. A guide containing such a ridge would be able to support higher modes of a lower frequency than the unloaded guide; as for example, such a rectangular waveguide may be loaded to have the same cut-off frequency for both the $TE_{10}$ and the $TE_{01}$ modes.

In many microwave applications it is oftentimes desirable to combine two independent signals having their electrical fields polarized in the 90 degree space relationship. One such combination is the $TE_{10}$ and $TE_{01}$ modes. Such composite signals are typically fed into the dual polarized feed horn of the presently used troposcatter communication parabolic antennas.

One such microwave structure for the requisite combination of such orthogonally polarized wave form is shown in my copending U.S. Application Serial Number 6,036, filed February 1, 1960, now Patent No. 3,150,333 entitled Microwave Horn in the name of David F. Bowman and assigned to the assignee of the instant invention. The signal coupler of my instant invention is an improvement over that described in the above noted copending application in that it is a much simpler and less expensively manufactured structure.

The structure of my above noted copending patent application requires two rather expensively constructed T sections into which the individual signals are introduced. These sections are nested and their respective output branches orientated about the throat opening of a microwave horn. The branch signals introduced are combined in the horn and emerge as a composite dual-polarized signal.

The instant invention performs the desired signal combination without requiring such expensively formed microwave structures as the aforementioned nested T inputs. Briefly stated, my invention introduces a first of the two individual signals at the signal end of an enclosure and permits that signal to translate longitudinally through the enclosure and emerge substantially unchanged at its aperture end. The second signal is introduced through a second signal opening located in the wall surface of the enclosure and in the vicinity of the signal end. Preferably, a thin ridge-like structure is centrally located across the waveguide opposite the second signal opening. The ridge and second signal openings are so orientated that the second signal will excite a mode in the enclosure which is orthogonally polarized with respect to the first signal. The ridge is located within the waveguide so that it will have a substantially negligible effect upon the transmission of the first signal therethrough.

The second signal introduced to the enclosure, (by virtue of the excitation of the ridge), propagates down the enclosure in the direction of the aperture end. The ridge-like structure is preferably tapered in the direction of the aperture end to match the impedance between the loaded signal end and unloaded aperture end; thereby effecting a low swr.

In the illustrated embodiment of my invention the $TE_{10}$ mode is introduced to the enclosure at a first signal opening. The second signal opening and the waveguide feeding it also contains the dominant $TE_{10}$ mode. However, this waveguide and opening are orientated with respect to the enclosure and the exciting ridge-like member to cause the generation of the $TE_{01}$ mode in the enclosure. The ridge-like member loads the enclosure sufficiently to permit the propagation of the $TE_{01}$ mode therein.

In the illustrated embodiments of my invention a portion of the enclosure is of square cross-section. Because the symmetry of such a waveguide it is somewhat ambiguous to speak of the $TE_{10}$ and $TE_{01}$ modes. For purpose of definition, that mode which is polarized in the same direction as the dominant mode at the first signal opening will be referred to as the $TE_{10}$ mode. That mode which is orthogonally related thereto, and polarized in the same direction as the dominant mode in the second signal opening will be referred to as the $TE_{01}$ mode.

A square waveguide is capable of supporting the same cut-off of frequency of both these orthogonally related $TE_{01}$ mode, with the length of each of the equal sides of the unloaded guide being equal to one-half of the cut-off wave length.

In one embodiment of the invention the entire enclosure unit is of constant square cross-section. A taper, or step size adapter would preferably be installed between the first signal opening of the enclosure and the waveguide introducing that signal of the enclosure, to permit a commercially available rectangular waveguide to be used. This waveguide would preferably have its long dimension equal to the above-mentioned square dimension, and its short dimension equal to one-half that length. The second signal opening, and its associated waveguide, is preferably of the same rectangular cross-section. This will permit the propagation of the $TE_{10}$ mode in both entrant waveguides over the same frequency band as the $TE_{10}$ and $TE_{01}$ modes propagated in the enclosure.

In another embodiment of my invention both of the signal openings are of the same general rectangular dimension. A gradual taper exists in the enclosure itself between the rectangular signal introduction end and the square aperture end.

In both embodiments, instead of a conventional ridge being excited, a "spear" shaped structure is preferably used. Such a "spear" has been found to give an improved impedance match over a broad operating band. The "spear" is also appropriately tapered to allow for a smooth impedance transition between the respective ends of the horn. The broad-band impedance match achieved with a "spear" makes my invention useful even in the absence of a second signal. Thus, although I illustrate the basic concept in a microwave structure for combining two individual signals, it would likewise be useful for a single signal H-plane bend.

The enclosure of the present invention is inherently broad-band. However, for critical performance requirements, impedance tuning controls may be readily incorporated. Such controls could be in the form of adjustable inductive posts or tuning screws. Such normally would require only a small range of adjustment.

It is accordingly a primary object of the present invention to provide a novel microwave signal coupler of simplified structure for combining two waves polarized 90 degrees apart.

Another object of the present invention is to provide a novel microwave structure containing a ridge-like member to provide for a broad-band impedance match between intersecting waveguides.

A further object of the present invention is to provide a simply constructed microwave system containing a loaded waveguide for smoothly combining (or separating) two signal bands polarized 90 degrees apart with low input standing wave ratios over a broad band of operation.

Still another object of the present invention is to provide a simplified signal coupler for combining two orthogonally polarized wave signals, wherein the individual signals are introduced into 90 degree space orientated waveguide openings at one end of an enclosure and emerge as a composite signal at the aperture end.

Still a further object of the present invention is to provide a generally elongated microwave apparatus for transmitting the dominant mode of energy therethrough substantially unaffected, while providing a simply constructed broad band impedance matching means to permit the introduction and propagation of an orthogonally polarized mode of microwave energy therethrough.

Yet another object of the present invention is to provide a microwave signal coupler to effect the combination of two orthognally polarized signals which is constructed of easily machinable and assembled component members.

It is yet a further object to load a waveguide with a ridge-like member to permit a broad band impedance match to both a through signal and a signal introduced at a wall opening near its signal end, while providing for a high degree of inter-signal isolation.

These as well as other objects of the instant invention will readily become apparent after reading the following description of the accompanying drawings in which.

Figure 1:
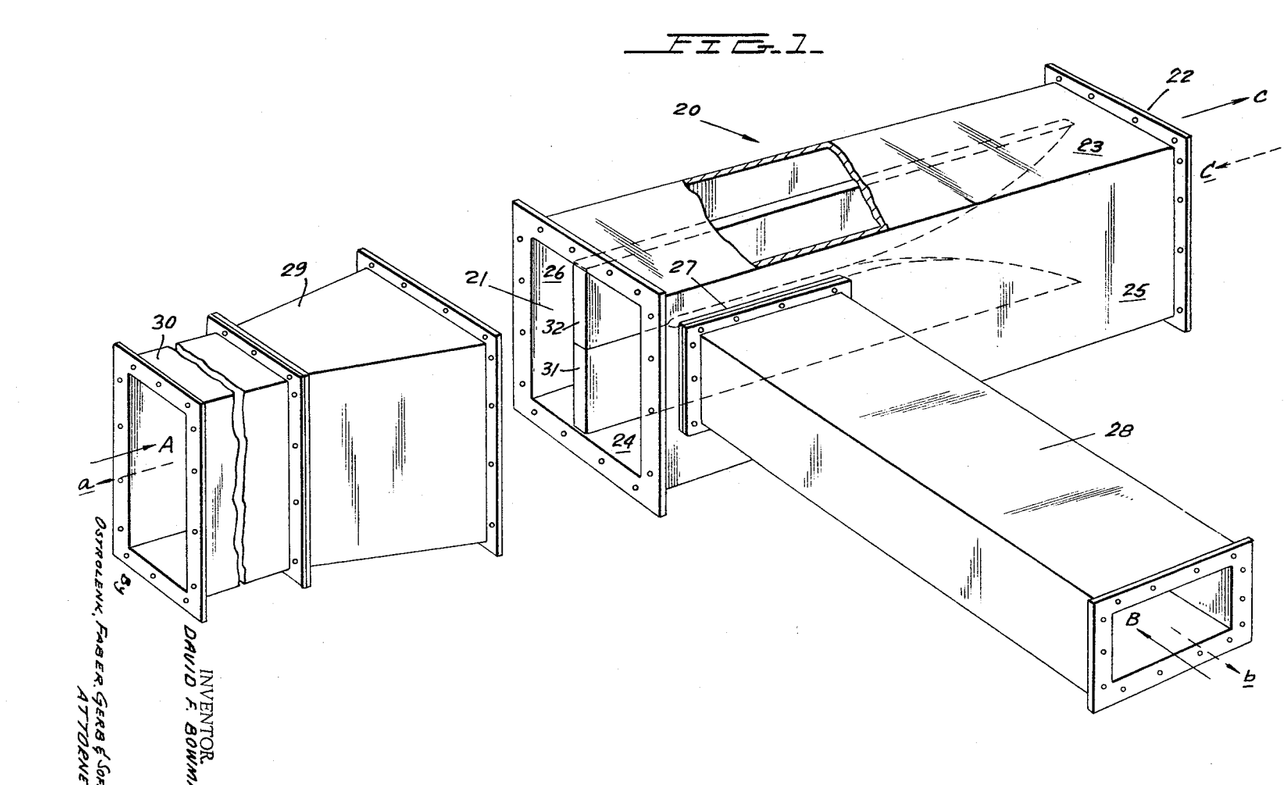
FIGURE 1 is a perspective view of an embodiment of my invention, with the enclosure interior exposed.

Referring to FIGURE 1, enclosure 20 may typically be a radiating horn or any other type of microwave equipment to transmit and preferably combine wave signals. Accordingly, the ensuing discussion will refer to enclosure 20 as being a horn with it being understood that the term is being used generally to refer to a variety of other microwave transmission structures. Horn 20 contains a signal introduction end opening 21 and a signal emergent opening, or horn aperture, 22. Both of these openings are of square cross-section in this embodiment. These ends are connected by wall area surfaces 23, 24, 25, 26, defining an enclosed waveguide structure. Wall surface 25 contains generally rectangularly shaped signal opening 27 near signal end 21. A conventional rectangular waveguide 28 is shown connected to opening 27. Square cross-section opening 21 is connected through a suitable adapter 29 to a similar rectangular waveguide 30.

The horn assembly 20 may be typically used to provide a high power broad band dual polarization feed at the aperture end 22 to paraboloid reflector antennas. The system may be used inversely, to pick up a dual polarized wave-front as c at its aperture 22 and separate it into independent waves *a* and *b* polarized 90 degrees apart. As a feed system two signals A and B in the band of operation are impressed through waveguides 28 and 30 respectively to the inputs 21 and 27 of horn 20. Wave signals A and B will be combined in horn section 20, in the manner set forth below, to produce a dual orthogonally polarized composite signal C at horn aperture end 22. Wave signals A and B may be of the same, or different frequencies, within the band width of operation.

Figure 2:
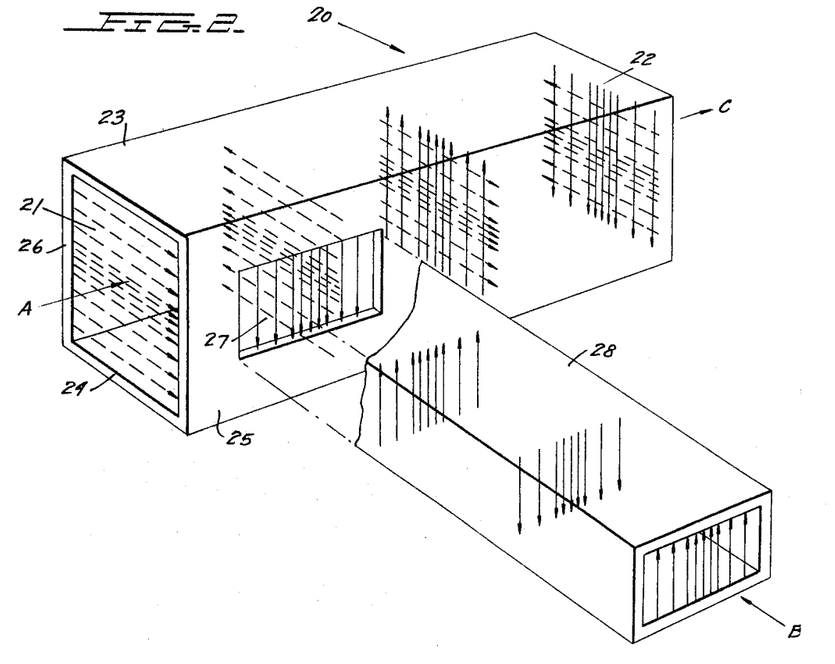
FIGURE 2 is generalized perspective view of the enclosure of FIGURE 1, with the excitation ridges removed, depicting the relationship between the polarizations of the respective signals.

In a preferred mode of operation, both the individual signals A and B exist in their respective waveguides (30, 28) in the dominant $TE_{10}$ mode. This is best shown in FIGURE 2 which illustrates the cyclic variation of the electric field associated with the signals. Waveguides 28 and 30 are dimensioned to support the $TE_{10}$ mode of the same frequency band. In practice, the same size waveguide would preferably be used for both. The length of each of the sides of the main horn square cross-section equals the long dimension of waveguides 28 and 30. This will permit unloaded square horn 20 to support the $TE_{10}$ and the $TE_{01}$ modes of the same frequency band.

A set of narrow ridge elements 31 and 32 are shown centrally located in horn 20 of FIGURE 1 and extending therethrough generally paralleled to sides 25 and 26. Since the unloaded main horn (20) of square cross-section is capable of supporting both of the orthogonally related signals the presence of a loading ridge is not essential. However, as will be more fully set forth below, ridge elements 31 and 32 are placed in horn 20 to improve the impedance match at the coupling zone so as to achieve a broader band width of usable operation.

For purposes of explanation consider the operation without ridge element 31 and 32. Signal A will be introduced to opening 21 in the $TE_{10}$ mode and propagate down horn section 20 emerging at aperture end 22 in that mode. Signal B is introduced at opening 27 in its $TE_{10}$ mode. It is so orientated with respect to horn 20 so as to excite a mode of polarization orthogonally related to signal A. This mode, herein nomenclated the $TE_{01}$ mode, will likewise enter horn 20 and be propagated in a longitudinal direction.

Figure 3:
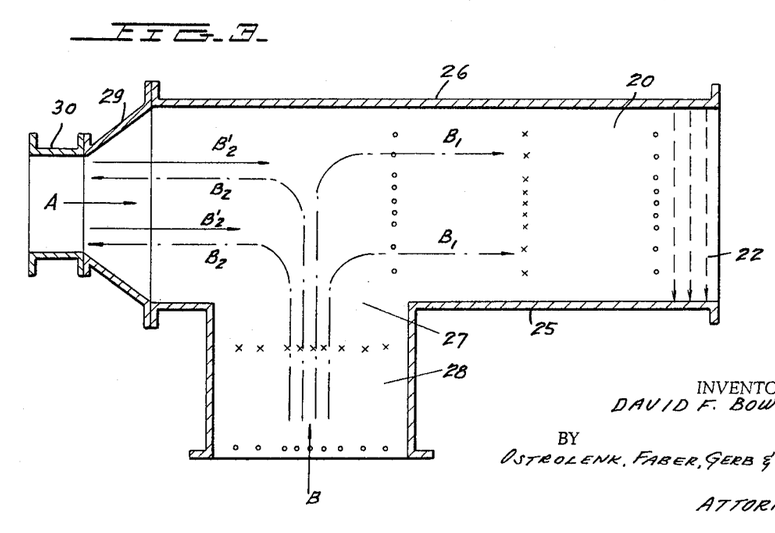
FIGURE 3 is a generalized plan view of FIGURE 1, with the top removed, showing the energy translation of one of the individual signals.
Figure 4:
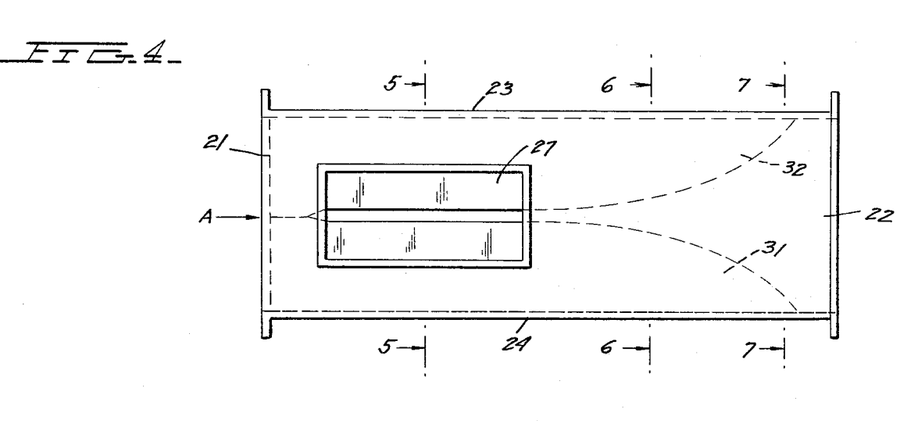
FIGURE 4 is a side elevation of the embodiment of FIGURE 1.

Reference is now made to FIGURE 3 which depicts the excitation of wave signal B in horn 20. The arrows simply indicate the general propagation of energy with it being understood that the individual components of the electrical field are transversely related thereto, as represented by the arrow ends. For purposes of clarity signal A is shown only at the opposite ends (21, 22) of horn 20 with it being understood that it co-exists with signal B along the horn. Wave signal B upon entering opening 27 of wall 25 of the unloaded horn 10 is capable of propagating in both longitudinal directions. Thus, signal B will be split into two wave-fronts ($B_1$, $B_2$) going in opposite directions along horn 20. Wavefront $B_2$ is capable of being supported until it reaches the rectangular waveguides 30 at the termination of intercoupler 29. This rectangular opening will serve as a reactance to completely reflect wave-front $B_2$, causing reflected wave $B'_2$. Preferably $B_2$ and $B'_2$ should coact so as to cancel each other and thereby prevent the energy of wave signal B from propagating towards horn opening 21. To achieve this, the opening of rectangular waveguide 30 at the terminus of intercoupler 29 would have to be positioned an odd number of quarter wave-lengths away from window opening 27. Practical considerations would prevent this distance to equal a single quarter wave-length. As the number of quarter wave-lengths is increased the band width of effective cancellation is decreased. Hence, this method of cancelling the propagation of wave signal B towards horn opening 21 severely restricts the usable band width of the signal coupler.

To improve the operation of this embodiment narrow ridge elements 31 and 32 may be centrally located in horn 20 in a plane generally parallel to sides 25 and 26. These ridge elements are sufficiently narrow in the transverse direction so as to have a negligible effect on the transmission of wave signal A. The ridge elements have a loading factor on horn 20 which serves to improve the impedance match at the coupling region between waveguides 28 and horn 20 and thereby effect a broader band of usable operation. Also, ridge elements 31 and 32 would preferably extend completely across the waveguide in the direction of horn opening 21 to act as a short for the propagation of channel B energy towards the channel A input. The shorting portion of the ridge would extend a sufficient longitudinal distance to act as an effective short. By varying the longitudinal extent of this short, a controllable reactance is obtained which may be adjusted for optimum impedance match about the coupling zone. If necessary, the shorting region of the ridges may even extend beyond horn 21 into intercoupler 29.

It is naturally understood that although I show the ridge elements 31, 32 being joined in the vicinity of horn wave signal B, this not a necessary limitation of my invention. Should the ridge elements 31, 32 not physically meet in this region, the reflection of wave signal B by rectangular waveguide 30 would serve to initiate the reflected wave for the cancellation of the channel B propagation.

Figure 5:
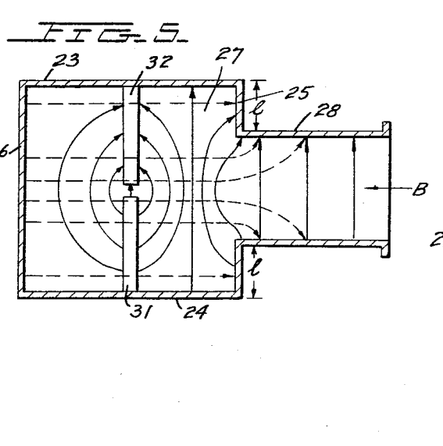
FIGURE 5 is a cross-section taken along line 5—5 of FIGURE 4 and looking in the direction of the arrows.
Figure 6:
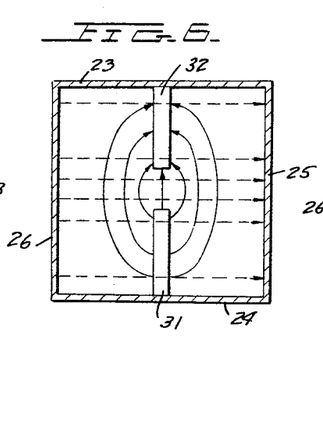
FIGURE 6 is a cross-section taken along line 6—6 of FIGURE 4 and looking in the direction of the arrows.
Figure 7:
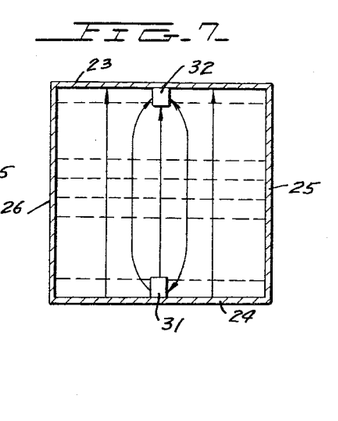
FIGURE 7 is a cross-section taken along line 7—7 of FIGURE 4 and looking in the direction of the arrows.

FIGURES 5-7 illustrate the progressive combination along horn 20 of the fields generated by individual signals A and B. It is noted, that the electrical field of signal A is substantially unaffected by the thin ridges and remains approximately parallel to wall surfaces 23 and 24 over the entire length of horn 20. Signal B, enters through opening 27, and initially consists of generally curved paths about ridge elements 31, 32 as shown in FIGURE 5. As signal B progresses down horn 20, as shown in FIGURES 6 and 7, the components of the electrical field tend to straighten out and emerge at opening 22 generally parallel to wall surfaces 25, 26. Thus, it is seen that the composite signal C emerging at horn aperture 22 consists of the dual polarized $TE_{10}$ and $TE_{01}$ modes.

Figure 8:
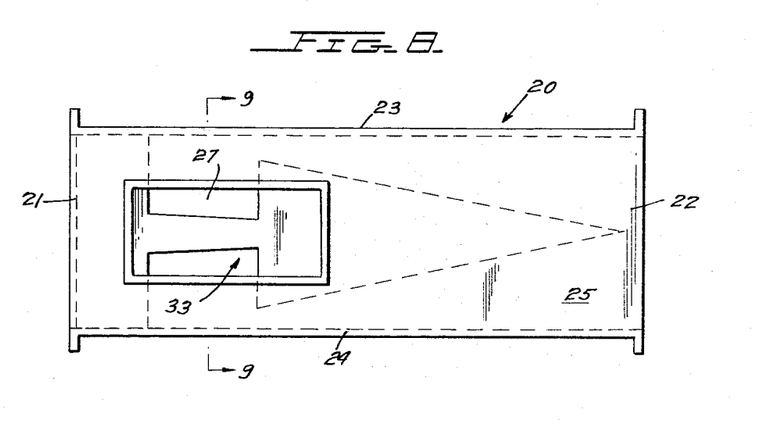
FIGURE 8 is a side elevation of the embodiment of FIGURE 1 with a "spear" replacing the ridges.
Figure 9:
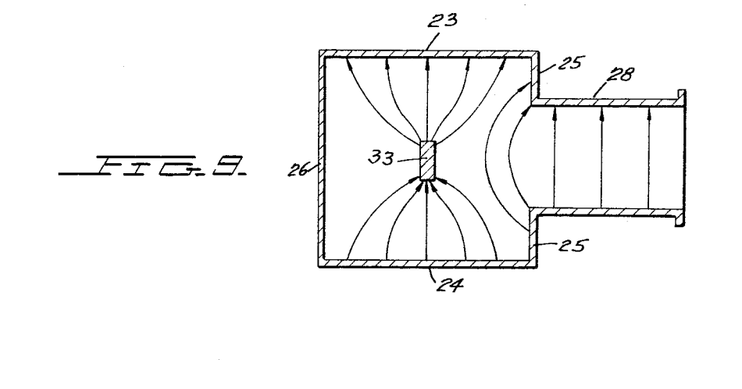
FIGURE 9 is a cross-section taken along line 9—9 of FIGURE 8 and looking in the direction of the arrows.

In FIGURES 8 and 9 ridge elements 31, 32 have been replaced with a single ridge-like "spear" member 33. This "spear" transposes the location of the ridge-like member with respect to wall surfaces 23, 24. That is, both ridges 31, 32 and "spear" 33 are contained in a plane between wall surfaces 23, 24; and generally parallel to wall surfaces 25, 26. Ridges 31, 32 are contained in this plane at its outer region adjacent to opposite walls 23, 24; with the area of this plane centrally located between walls 23, 24 being vacant. "Spear" 33 is contained in the aforementioned vacant area centrally located between opposite walls 23 and 24; the opposite ends of the plane, adjacent to walls 23, 24 now being vacant.

This ridge configuration results in a significantly broader band width of impedance match in the coupling region. It has been found that the propagation of the channel B energy to individual ridge elements 31, 32 to establish the field pattern of FIGURE 5 results in a resonant cavity between window opening 27 and ridge elements 31, 32. Such a resonant effect is caused by the manner in which the longitudinal wall currents associated with the field lines are transferred from waveguide 28 to horn 20 and ridge elements 31, 32. When length *l*, as illustrated in FIGURE 5, is equal to a multiple of quarter wave lengths within the guide of the signal being transferred, a resonance will be established. Such resonances, will usually be established within the intended band width of the couplers operation. The creation of such resonances results in extremely high impedance mis-match in the immediate vicinity of such resonant frequency, thereby reducing the usable band width of operation.

FIGURE 9 illustrates the wave fields generated in the vicinity of "spear" member 33 in the coupling region. Quite a different pattern is set up in the transferring of the field lines from waveguide 28. The longitudinal wall currents associated with this field pattern do not flow through a cavity like region X to form the resonant effect of the dual ridge embodiment. By preventing the formation of such regions of resonance within the intercoupling region, this embodiment has a substantially greater band width than the aforementioned embodiment.

FIGURES 10 through 17 illustrates a preferred embodiment of my invention in which the signal end opening 21 is of rectangular cross-section, thereby eliminating the need for the size adapter 29. A gradual taper exists in the horn itself between end openings 21 and 22. Inasmuch as horn 20 is now of a generally rectangular cross-section in the signal coupling region, such an unloaded cross-section is unable to support the $TE_{01}$ mode which channel B would introduce therein. A "spear" like ridge 33 is inserted in the region of the coupling zone so as to properly load horn 20 to support the $TE_{01}$ mode of the same band width which it is capable of supporting in the $TE_{10}$ mode. Alternatively, ridge elements 31, 32 could be used to achieve such loading. However, as discussed above, the "spear" permits a broader band width of operation.

Figure 12:
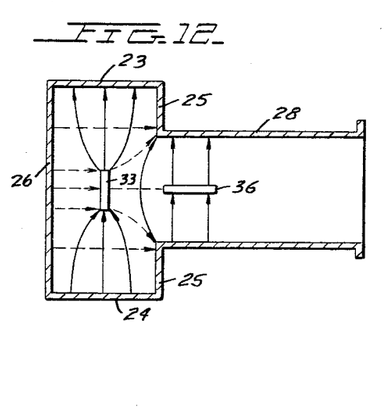
FIGURE 12 is a cross-section taken along line 12—12 of FIGURE 11 and looking in the direction of the arrows.
Figure 13:
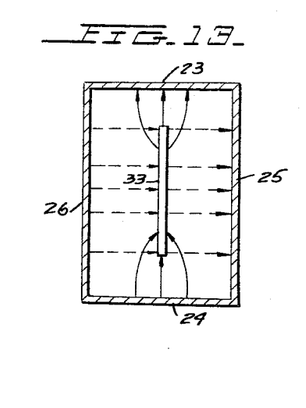
FIGURE 13 is a cross-section taken along line 13—13 of FIGURE 11 and looking in the direction of the arrows.
Figure 14:
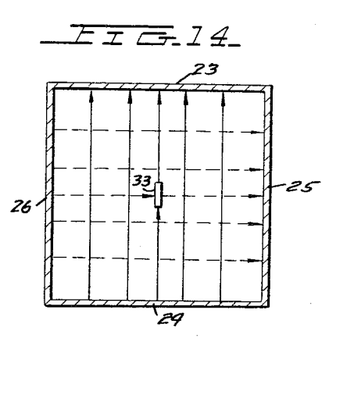
FIGURE 14 is a cross-section taken along line 14—14 of FIGURE 11 and looking in the direction of the arrows.

The "spear" like member reacts in the coupling zone in a manner analogous to the above discussion of FIGURES 8 and 9 to effect a broad band impedance match between channel B and horn 20. FIGURES 12 through 14, illustrate the configuration of the wave-front along horn 20. Signal A is seen to propagate down horn 20 substantially uneffected by the presence of "spear" 33. "Spear" 33 loads horn 20 in the vicinity of windows 27 to transform the signal B into two individually curved wave lines in the general $TE_{01}$ mode of propagation. As signal B propagates down horn 20 the curve paths tend to straighten out and emerge in the $TE_{01}$ mode at aperture ends 22. The region 35 of the "spear" between openings 21 and 27 is shown as extending completely across the horn and will serve as a short. Such short initiates the reflected wave, to prevent the wave energy introduced at opening 27 from propagating towards the channel A input. The solid portion 35 of the "spear" of FIGURES 15–17 also serves as a physical support to position "spear" 33 in horn 20. It is to be understood that the short to the propagation of channel B energy created by "spear" region 35 is only a preferred feature of my invention. Unloaded guide 30 would provide a reflected wave where such shorting portion 35 removed. However, region 35 provides a controllable reactance which may be properly adjusted to effect optimum band width.

Portion 36 of "spear" 34 which projects towards aperture end 22 is appropriately tapered to effect the above noted impedance transformation between the signal and aperture ends of the horn. A smooth continuous taper is shown.

Figures 10, 15, 16, 17:
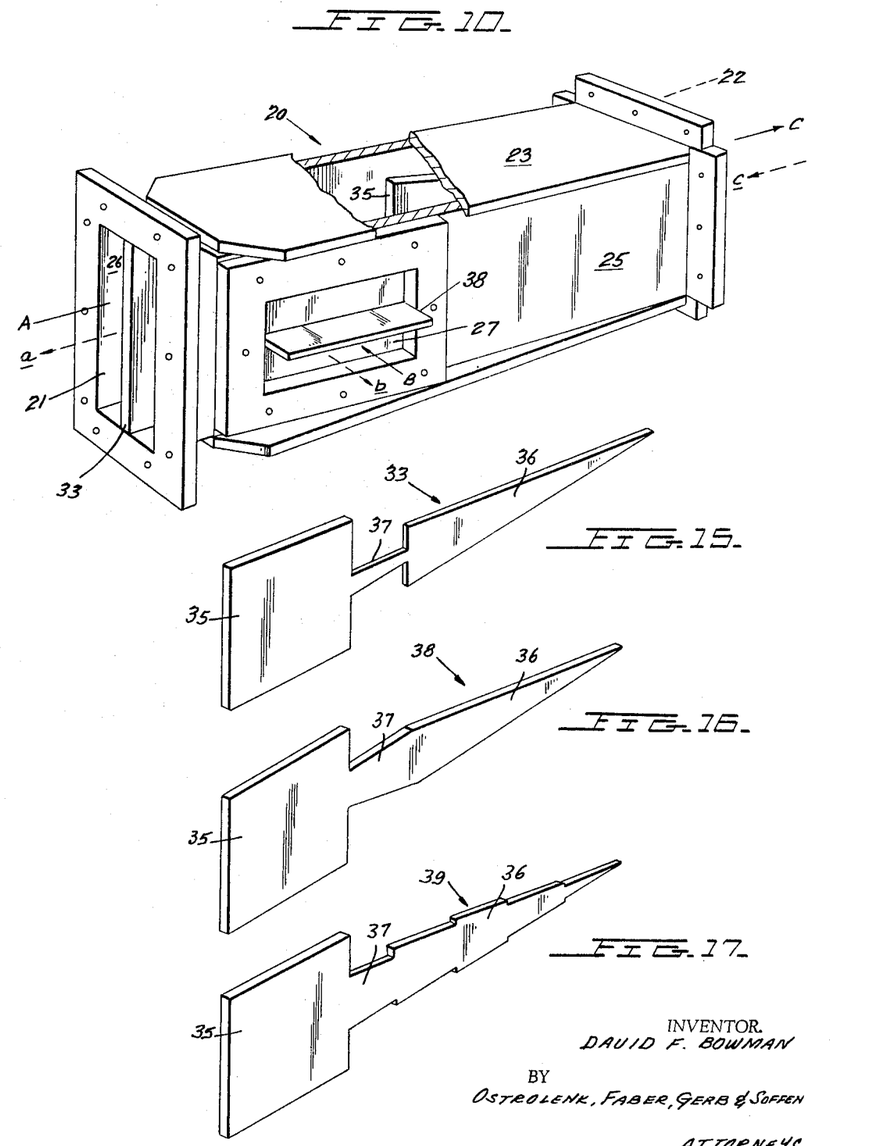
FIGURE 10 is a perspective view of a preferred embodiment of my invention.
FIGURE 15 is a perspective view of the signal excitation "spear" of the embodiment of FIGURES 10 and 11.
FIGURES 16 and 17 are alternative "spear" embodiments which may be used in the preferred embodiment of my invention.
Figure 11:
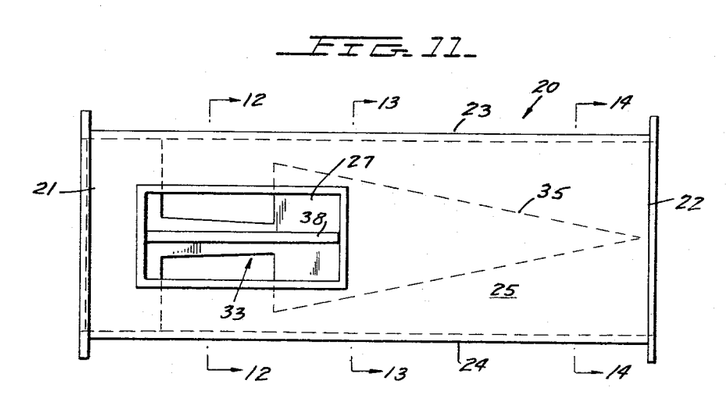
FIGURE 11 is a side elevation of the embodiment shown in FIGURE 10.

FIGURES 16 and 17 illustrate alternative "spear" embodiments 38 and 39 which have provided broad band operation with low swr. A discontinuous taper may be used in region 36 as shown in alternate "spear" 39. This series of discontinuities is designed so that the individual discontinuities compensate for one another. Such a stepped taper might be employed to minimize the length of horn 20 between signal opening 27 and aperture end 22. "Spear" 33 was appropriately undercut at 37 to provide optimum impedance matching. In "spear" 38 a discontinuous taper in region 37 was found to provide a broad band impedance match. In addition tuning posts may be inserted in the horn, across window or attached to the "spear" in the coupling region to improve the band width of impedance match.

A bar or septum 38 extends across channel B input window, 27. This septum compensates for the portion of wall 25 removed by the presence of window 27. Since wall 25 must provide a path for the longitudinal currents associated with channel A, the removal of a portion of that wall at 27 would tend to restrict the flow of such longitudinal currents. Such a restriction would effect the propagation of channel A through horn 20. Septum 38 is inserted to replace that portion of wall 25 removed to permit a more continuous path for the longitudinal currents associated with channel A.

The edges of septum 38 would preferably be rounded to prevent the concentration of field lines which would limit the power handling capabilities of the coupler. Also, a thickening member (not shown) might be added to the "spear" in the vicinity of 27 to additionally compensate for the removed portion of wall 25. The presence of such channel A compensating members will have a negligible effect on a wave polarized as channel B.

Although the E plane opening of waveguide 28 is shown as generally parallel to wall 25 this is not a necessary limitation of my invention. This opening 27 may likewise be parallel to the longitudinal axis of horn 20 or make any angle therewith.

Although my illustrated embodiments show aperture end 22 as being of square cross-section, this is only a preferred form and my invention would also be practiced with a circular or other horn aperture cross-sections capable of maintaining two orthogonally polarized modes. The shape of the horn is basically determined by the desired frequency range and polar pattern of radiation in accordance well known horn theory.

A simplified horn aperture 22 is illustrated, however, it is understood that other arrangements well known in the art may be alternatively employed. Since such an aperture would be typically used to radiate into a reflector or lens, or into free space, it would be constructed in accordance with the intended horn application. Also, while the exemplary apparatus has been described for transmitter use, it is also understood that it may be operated in receiving apparatus in the inverse manner referred to herein above.

A practical working embodiment of the instant invention has been constructed to couple the orthogonally polarized waves propagated in the commercially well known WR430 waveguides. This working embodiment demonstrated a maximum standing wave ratio of less than 1.2 over a substantial segment of the intended band width of operation of that waveguide without adjustment. The interchannel isolation was in excess of 45 db. Also, since no concentration of field lines exist, the coupler is capable of handling high power levels not far reduced from the inherent power level capacity of the input waveguides.

Although I have here described preferred embodiments of my novel invention many variations and modifications will now be apparent to those skilled in the arts and I therefore prefer to be limited not by the specific disclosure herein but only by the appending claims.

The embodiments of the invention in which an exclusive privilege or property is claimed are defined as follows.

I claim:
1. A signal coupler comprising an enclosure having a first, second and third opening; said first and third openings being joined by a wall area and being positioned at respective end regions thereof; said wall area including a first and a second pair of generally planar wall surfaces; the wall surfaces of said first pair being perpendicular to the wall surfaces of said second pair; the planes defined by each of said wall surfaces intersecting the plane defined by said first opening; one of said first pair of wall surfaces containing said second opening; said second opening being located away from said first opening; said third opening being positioned to introduce a first wave signal into said enclosure; said second opening being positioned to introduce a second wave signal into said enclosure, said second wave signal being orientated 90 degrees apart in space with respect to said first wave signal; a ridge-like member being contained in a plane generally perpendicular to said second pair of wall surfaces and extending therebetween; a first portion of said ridge-like member being so dimensioned and positioned to deflect said second wave signal towards said first opening, while offering negligible interference, to said first wave signal; and said ridge-like member means extending substantially between said first and third openings, and being of its greatest planar extent in the region between said second and third openings.

2. A signal coupler as defined in claim 1, wherein said ridge-like member is of generally spear shaped configuration with a portion of reduced cross section in the vicinity of said second opening.

3. A signal coupler as defined in claim 1 wherein said ridge-like member is bifurcated adjacent said second opening and is reduced in planar extent toward said first opening.

4. A signal coupler comprising an enclosure having a first, second and third opening; said first and third openings being joined by a wall area and being positioned at respective end regions thereof; said wall area including a first and a second pair of generally planar wall surfaces; the wall surfaces of said first pair being perpendicular to the wall surfaces of said second pair; the planes defined by each of said wall surfaces intersecting the plane defined by said first opening; one of said first pair of wall surfaces containing said second opening; said second opening being located away from said first opening; said third opening being positioned to introduce a first wave signal into said enclosure; said second opening being positioned to introduce a second wave signal into said enclosure, said second wave signal being orientated 90 degrees aparts in space with respect to said first wave signal; a ridge-like member being contained in a plane generally perpendicular to said second pair of wall surfaces and extending therebetween; a first portion of said ridge-like member being so dimensioned and positioned to deflect said second wave signal towards said first opening, while offering negligible interference, to said first wave signal; said ridge-like member being of generally "spear" shape, and comprising said first portion, and a second portion; said first portion being in the region of said second opening; said second portion being continuously tapered between said second and first openings; and said first and second portions being centrally located between the wall surfaces of said second pair.

5. A signal coupler comprising an enclosure having a first, second and third opening; said first and third openings being joined by a wall area and being positioned at respective end regions thereof; said wall area including a first and a second pair of generally planar wall surfaces; the wall surfaces of said first pair being perpendicular to the wall surfaces of said second pair; the planes defined by each of said wall surfaces intersecting the plane defined by said first opening; one of said first pair of wall surfaces containing said second opening; said second opening being located away from said first opening; said third opening being positioned to introduce a first wave signal into said enclosure; said second opening being positioned to introduce a second wave signal into said enclosure, said second wave signal being orientated 90 degrees apart in space with respect to said first wave signal; a ridge-like member being contained in a plane generally perpendicular to said second pair of wall surfaces and extending therebetween; a first portion of said ridge-like member being so dimensioned and positioned to deflect said second wave signal towards said first opening, while offering negligible interference, to said first wave signal; said ridge-like member being of generally "spear" shape, and comprising said first portion, a second and a third portion; said first portion being in the region of said second opening; said second portion being continuously tapered between said second and first openings; said first and second portions being centrally located between the wall surfaces of said second pair; and said third portion being located between said second and third openings and extending completely between the wall surface of said second pair.

6. A signal coupler comprising an enclosure having a first, second and third opening; said first and third openings being joined by a wall area and being positioned at respective end regions thereof; said wall area including a first and a second pair of generally planar wall surfaces; the wall surfaces of said first pair being perpendicular to the wall surfaces of said second pair; the planes defined by each of said wall surfaces being substantially perpendicular to the plane defined by said first opening; one of said first pair of wall surfaces containing said second opening; said second opening being located away from said first opening; said third opening being positioned to introduce a first wave signal into said enclosure; said second opening being positioned to introduce a second wave signal into said enclosure, said second wave signal being orientated 90 degrees apart in space with respect to said first wave signal; a ridge-like member centrally located in said enclosure to combine said first and second waves at said first opening; a first portion of said ridge-like means being so dimensioned and positioned to deflect said second wave signal towards said first end opening while offering negligible interference to said first wave signal; said ridge-like member being contained in a plane generally perpendicular to said second pair of wall surfaces and extending therebetween; said second and third openings being of substantially the same rectangular cross-section; said first opening being of a different cross-section; said second and third openings being constructed to have guide means connected thereto; each of said guide means being dimensioned to transmit the $TE_{10}$ mode of substantially the same wave signal band; said ridge-like member coacting with the $TE_{10}$ mode of said second wave signal to produce the $TE_{01}$ mode at said first opening; said ridge-like member being of generally "spear" shape, and comprising said first portion, and a second portion; said first portion being in the region of said second opening; said second portion being continuously tapered between said second and first openings; and said first and second portions being centrally located between the wall surfaces of said second pair.

References Cited by the Examiner
UNITED STATES PATENTS

| | | | |
|---|---|---|---|
| 2,922,961 | 1/1960 | Robertson | 333—34 |
| 2,965,898 | 12/1960 | Lewis | 343—756 |
| 3,004,228 | 10/1961 | Fogel | 333—9 |
| 3,150,333 | 9/1964 | Bowman | 333—9 |

HERMAN KARL SAALBACH, *Primary Examiner.*

G. TABAK, P. L. GENSLER, E. LIEBERMAN,
*Assistant Examiners.*